(12) United States Patent
Marchel

(10) Patent No.: US 7,556,272 B2
(45) Date of Patent: Jul. 7, 2009

(54) TWIST AXLE SUSPENSIONS

(75) Inventor: Jacek Marchel, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 513 days.

(21) Appl. No.: 11/219,893

(22) Filed: Sep. 6, 2005

(65) Prior Publication Data
US 2007/0052194 A1 Mar. 8, 2007

(51) Int. Cl.
B60G 21/055 (2006.01)
(52) U.S. Cl. .................. 280/124.103; 280/124.128
(58) Field of Classification Search .......... 280/124.166, 280/124.107, 124.106, 124.128, 124.103
See application file for complete search history.

(56) References Cited

U.S. PATENT DOCUMENTS

| | | | | |
|---|---|---|---|---|
| 5,409,255 A * | 4/1995 | Alatalo et al. | .......... | 280/124.166 |
| 5,520,407 A * | 5/1996 | Alatalo et al. | .......... | 280/124.166 |
| 6,047,978 A * | 4/2000 | Watanabe et al. | ..... | 280/124.106 |
| 6,487,886 B2 * | 12/2002 | Ueno et al. | ..................... | 72/57 |
| 6,523,841 B2 * | 2/2003 | Glaser et al. | .......... | 280/124.106 |
| 6,533,300 B1 * | 3/2003 | Hicks et al. | ........... | 280/124.106 |
| 6,609,764 B2 * | 8/2003 | Dudding et al. | .......... | 301/124.1 |
| 6,702,308 B2 * | 3/2004 | Yamaguchi | .......... | 280/124.166 |
| 6,758,921 B1 * | 7/2004 | Streubel et al. | ............. | 148/593 |
| 7,204,498 B2 * | 4/2007 | Alesso et al. | ......... | 280/124.106 |
| 7,322,590 B2 * | 1/2008 | Kye | .................... | 280/124.106 |
| 2004/0007846 A1 * | 1/2004 | Inoue et al. | ........... | 280/124.166 |
| 2004/0256828 A1 * | 12/2004 | Han et al. | ............. | 280/124.106 |
| 2006/0017253 A1 * | 1/2006 | Kye | .................... | 280/124.107 |
| 2006/0131829 A1 * | 6/2006 | Alesso et al. | ......... | 280/124.166 |
| 2007/0052192 A1 * | 3/2007 | Kawanobe et al. | ..... | 280/124.13 |

(Continued)

FOREIGN PATENT DOCUMENTS

DE 60024313 T2 6/2006

(Continued)

OTHER PUBLICATIONS

Brockenbrough, Roger L; Merrit, Frederick S, Structural Steel Designer's Handbook, section 3.21.*

(Continued)

Primary Examiner—John Q. Nguyen
Assistant Examiner—Karen Amores

(57) ABSTRACT

A twist axle suspension for an automotive vehicle comprises first and second trailing arms, each having a front end and a rear end joined by an intermediate portion providing a weld site. The front ends of the trailing arms have pivots pivoted to the body of the automotive vehicle and the rear ends of the trailing arms support spring and damped rear wheels of the automotive vehicle. A perforated twist axle having first and second end sections abuts and is welded to the trailing arms at the weld sites. An arcuate apex portion joins the perforated walls to provide the twist axle with a V-shaped cross section having a shear center line disposed above the arcuate portion, the shear center being spaced a selected distance H above the axes about which the trailing arms pivot. A straight intermediate section of the twist axle is displaced from the first and second end sections to lower or raise the shear center line at the intermediate section without affecting the welds of the first and second end sections to the trailing arms.

9 Claims, 5 Drawing Sheets

U.S. PATENT DOCUMENTS

2007/0052194 A1* 3/2007 Marchel ............... 280/124.166
2007/0069496 A1* 3/2007 Rinehart et al. ....... 280/124.166
2007/0246904 A1* 10/2007 Murata et al. ......... 280/124.128
2007/0290474 A1* 12/2007 Inoue et al. ........... 280/124.166

FOREIGN PATENT DOCUMENTS

| EP | 0552537 A1 | 11/1992 |
| EP | 1297977 A2 | 9/2002 |
| JP | 2004-330928 | 11/2004 |

OTHER PUBLICATIONS

Shear Center Concept, Georgia Tech, Shear Center in Thin-Walled Beams Lab http://www.ae.gatech.edu/people/jcraig/classes/ae3145/Lab7/shear-center-theory.pdf.*

E.Armanio, The Shear-Center Concept [ppt], Aerospace Engineering, Georgia Tech, http://www.ae.gatech.edu/people/earmanio/COURSES/ae3120/ClassNotes/shearcenterpost.pps.*

Shigley, Joseph Edward; and Mitchell, Larry D.; Mechanical Engineering Design, McGraw-Hill Book Company, New York 1983; section 2-15.*

* cited by examiner

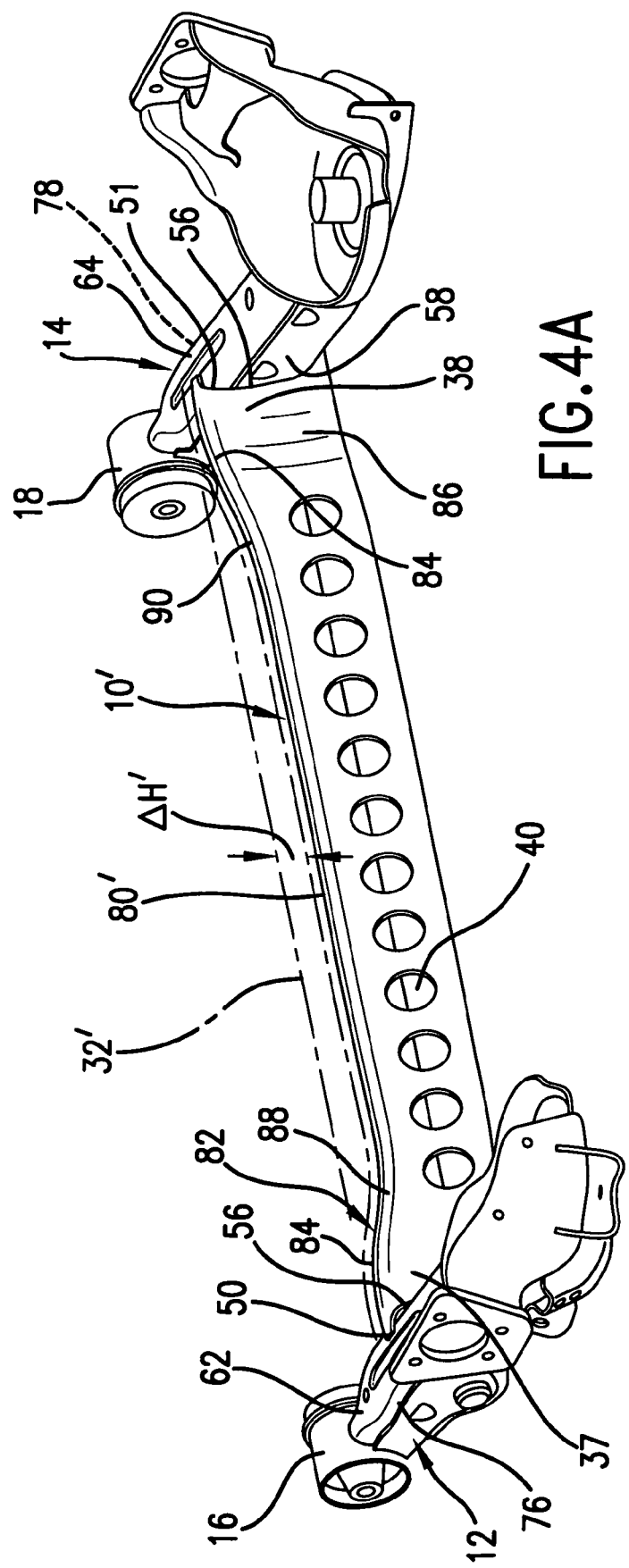
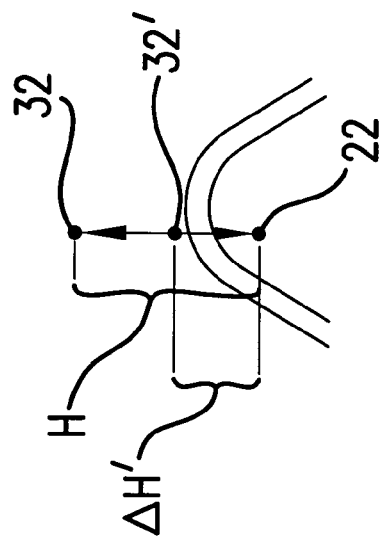
FIG.4A
FIG.4B

TWIST AXLE SUSPENSIONS

FIELD OF THE INVENTION

The present invention is directed to twist axle suspensions utilized as rear suspensions for front wheel drive automotive vehicles. More particularly, the present invention relates to configurations of twist axles configured with respect to consideration of welding connections between the twist axles and associated trailing arms.

BACKGROUND OF THE INVENTION

Twist axle suspensions are commonly used for the rear suspension of front wheel drive vehicles. As is shown in the prior art illustration of FIG. 1, a twist axle 10 is in combination with first and second trailing arms 12 and 14 that are pivoted by bushings 16 and 18 to a frame or unibody of an automotive vehicle to pivot about coaxial axes 20 and 22, respectively. Wheels 23 and 24 are mounted to hubs 25 disposed at rear ends 26 and 27 of each of the trailing arms 12 and 14. Seats 28 and 29 are provided to support coil springs 30 (only one of which is shown) at the rear ends 26 and 27 of the trailing arms, while dampers 31 (only one of which is shown) are mounted by supports secured proximate the rear ends 26 and 27 of the trailing arms 12 and 14.

Referring now to FIG. 2, since both the road steer and response time of a vehicle are among its critical handling parameters, the twist axle 10 must be designed with an appropriate shear center line location that is defined as a distance "H" between the axles 20 and 22 of the bushings 16 and a shear center line 32. It is desirable that the distance "H" be optimized for specific models of the vehicle. If the specific vehicle platform is used with vehicle models having different ranges of suspension trim, mass and tire parameters, for example, a challenge arises because these differences require different values for the dimension H. Vehicle manufacturers have to either compromise the vehicle by using an axle designed for other models with less than optimal dimensions H, or be forced to manufacture another, different axle with a desired value for H. Resolving this issue is made more complex because it is necessary to maintain critical weld configurations at the junctures between the twist axle 10 and the pair of trailing arms 12 and 14.

SUMMARY OF THE INVENTION

A twist axle suspension for an automotive vehicle comprises first and second trailing arms to which a twist axle is welded. The first and second trailing arms each have first and second ends joined by an intermediate portion. The intermediate portion provides weld sites for the ends of the twist axle. The front ends of the trailing arms have pivots that are pivoted to the frame or unibody of the automotive vehicle, while the rear ends of the trailing arms support rear wheels of the automotive vehicle with spring and damper arrangements. The twist axle has first and second end sections abutting and welding to the trailing arms at the weld sites thereof and has a first wall portion facing the front ends of the trailing arms and a second wall portion facing the rear ends of the trailing arms. An apex portion of the twist axle joins the wall portions to provide the twist axle with a cross section having a shear centerline disposed above the apex portion. The shear center lines at the end sections of the twist axle are spaced selected distances H above the axes about which the trailing arms pivot. An intermediate section of the twist axle is displaced from the first and second end sections to adjust the shear center line of the intermediate section without affecting the welds of the first and second end sections of the twist axle to the first and second trailing arms.

A further embodiment of the twist axle suspension, the first and second end sections of the twist axle have concave edges having a profile complementing convex inside profiles of the trailing arms.

In a further aspect of the twist axle suspension, the concave edges extend below and above the profiles of the trailing arms with the apex portion of the twist axle extending partially over the twist axle.

In still a further aspect of the invention, the trailing arms have inwardly facing outer surfaces and outwardly facing outer surfaces and wherein the profiles of the end sections of the twist axle are substantially C-shaped, are welded to the inwardly facing outer surfaces of the trailing arms, and terminate inboard of the outwardly facing outer surfaces of the trailing arms.

In still another aspect of the twist axle suspension, the shear center line of the intermediate section is below the shear center lines of the end sections; while in still a further aspect of the twist axle suspension, the shear center line of the intermediate section is above the shear center lines of the end sections.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 4A is a perspective side view of a twist axle assembly configured in accordance with the principles of one embodiment of the present invention;

FIG. 4B is an elevation through the twist axle of FIG. 4A showing a change ΔH' between the end section of the twist axle and an intermediate section;

DETAILED DESCRIPTION OF THE DRAWINGS

Figure 1:
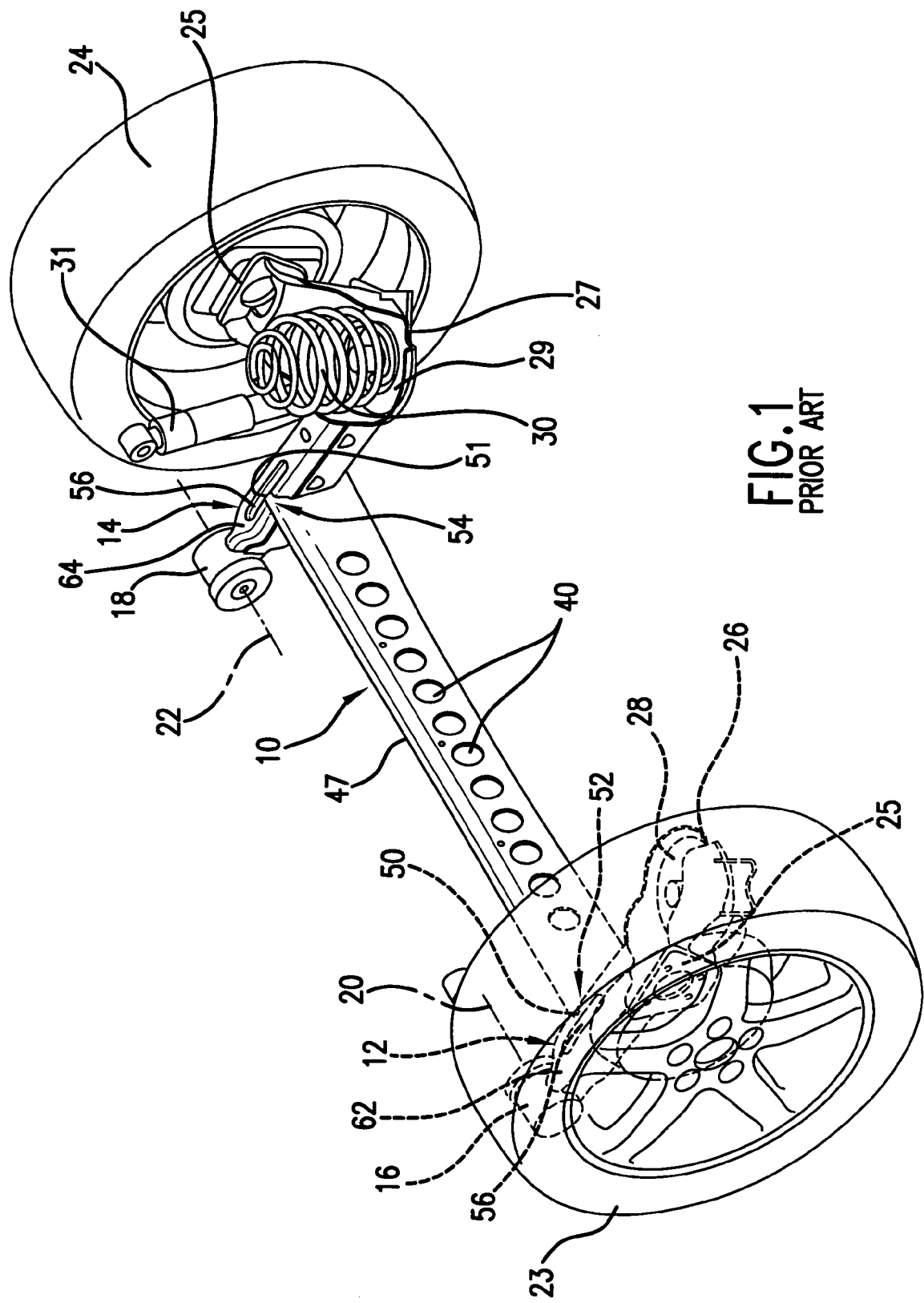
FIG. 1 is a top perspective view of a twist axle suspension in accordance with the prior art.
Figure 2:
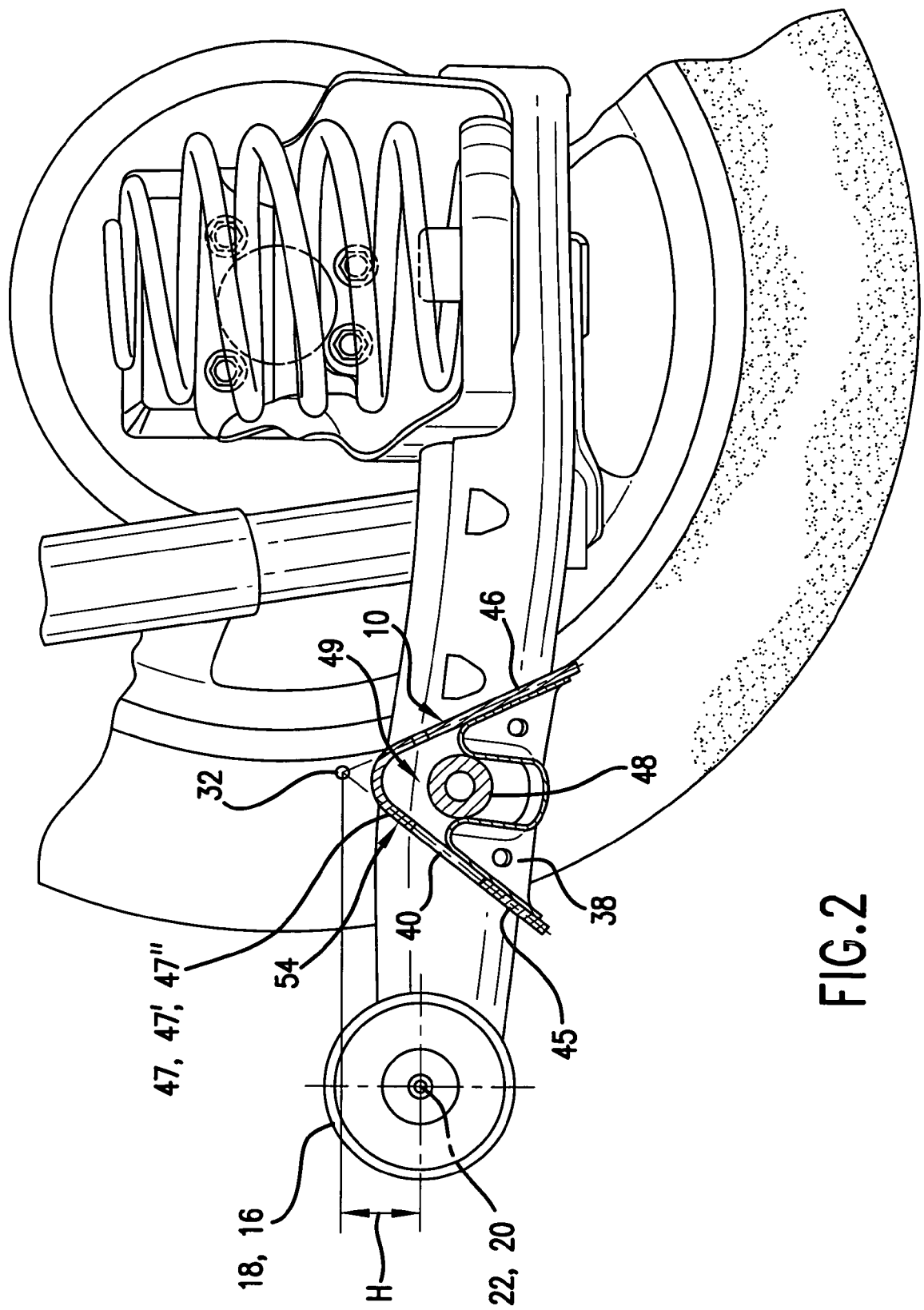
FIG. 2 is an inside view of a rear wheel assembly showing the location of the shear center of a twist axle with respect to the axes of mounting bushings for both the prior art and present invention.
Figure 3:
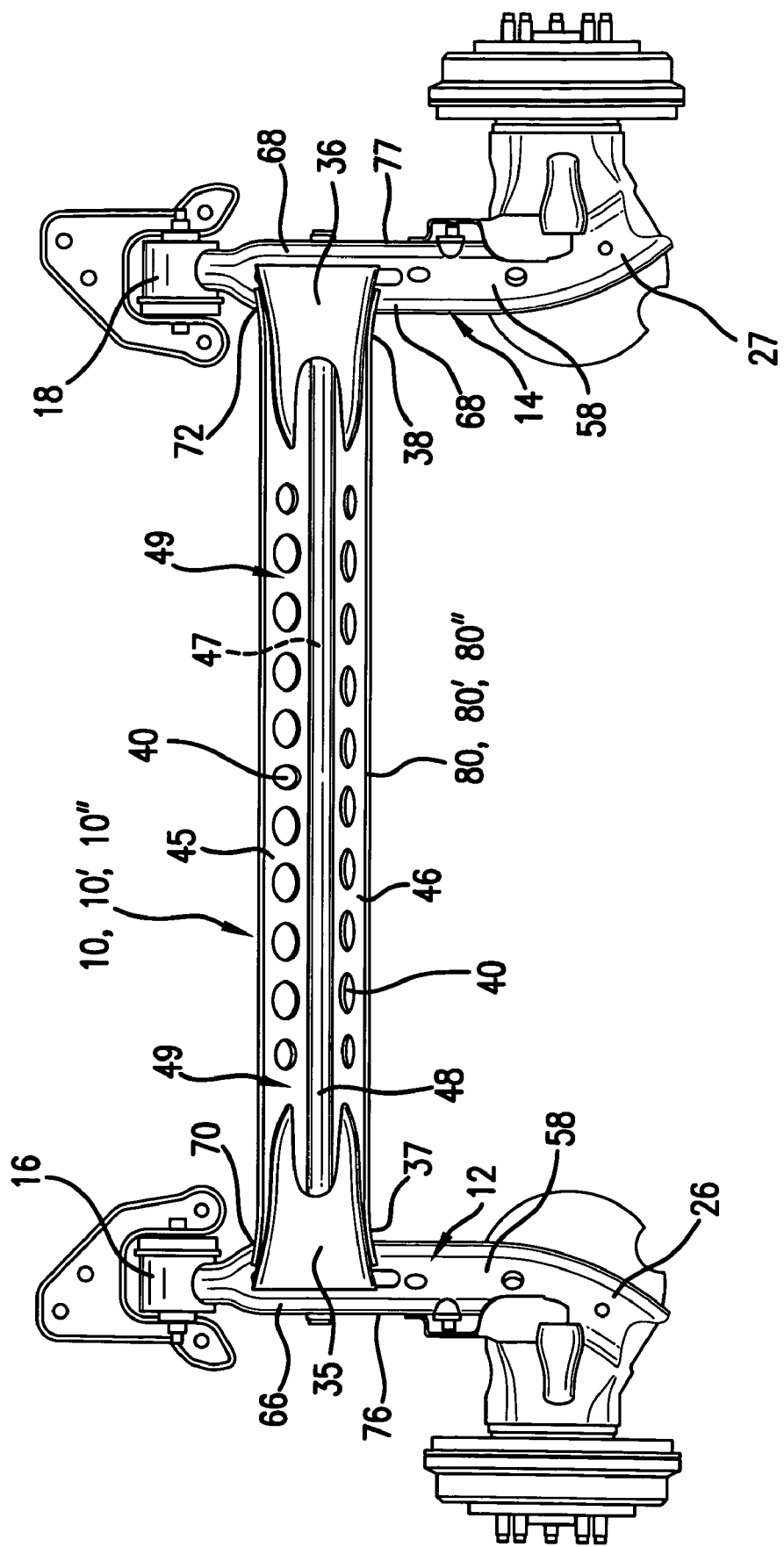
FIG. 3 is a bottom view of the twist axle suspension of FIGS. 1 and 2.

Referring now to FIGS. 1-3, FIG. 1 discloses the previously discussed "prior art" arrangement and FIG. 2-3 disclose structure which is common to both the prior art arrangement of FIG. 1 and the structure of the present invention as exemplified in FIGS. 4 and 5. As is best seen in FIG. 2, the twist axle 10 has a shear center 32 which is vertically displaced by the distance H from the axes 20 and 22 defining the center of bushings 16 and 18. Since the bushing 16 is situated similar to the bushing 18, the vertical dimension H is the same for bushing 16 and as for the bushing 18. As is seen in FIGS. 2 and 3, brackets 35 and 36 are nested within and welded to end sections 37 and 38 of twist axle 10 as well as being welded to the trailing arms 12 and 14.

As is seen in all of the figures, the twist axles 10, 10' and 10" (FIGS. 4 and 5) in a preferred embodiment have circular openings 40 in opposed wall sections 45 and 46 thereof which are joined by arcuate apeces 47, 47' and 47" thereof to form V-shaped twist axles. As is seen in the bottom view of FIG. 3 and the side view of FIG. 2, a tube 48 preferably extends through the V-shaped space 49 between the wall portions 45 and 46 and through the trailing arms 12 and 14. The tube 48 preferably is welded to the trailing arms 12 and 14.

The twist axles 10, 10' and 10" have a preferred cross-sectional configuration; however, the twist axle may have other embodiments with different cross-sectional configurations such as, but not limited to, "U" or "C" cross-sectional configurations. While the tube 48 is employed in the preferred embodiments, in other embodiments the tube 48 is not used, or is optional regardless of the twist axle cross-section.

As is seen in FIGS. 1-5, the twist axles 10, 10' and 10", respectively, each have identical weld junctures 50 and 51 at the end sections 37 and 38, which weld junctures have concave edges 56 having a C-shaped profile complementing convex inside surface profiles 58 of the trailing arms. The end portions 37 and 38 of the twist axles 10, 10' and 10" overlie the upper surface 62 and 64 of the trailing arms 12 and 14, respectively. As is seen in FIG. 3, the bottom surfaces 66 and 68 of the trailing arms 12 and 14 are engaged by undercutting portions 70 and 72 of the twist axles 10, 10' and 10". The twist axles 10, 10' and 10" terminate inboard the outwardly facing outer surfaces 76 and 77 of trailing arms 12 and 14. The weld at the weld junctures 50 and 51 is used to secure the twist beams 10, 10' and 10" to the specific geometry of the trailing arms 12 and 14. The concave edges 56 occurs at the end sections of the twist axle regardless of the cross-sectional configuration of the twist axle.

It is desirable to optimize the dimension "H" between the shear center line 32 and the axes 20 and 22 of the bushings 16 and 18 for particular vehicles, while not having to change the weld junctures 50 and 51 at the twist beam-trailing arm interface for different car models, having different suspension trim, mass and tire parameters. As is seen in FIGS. 4 and 5, this is accomplished by changing the dimension "H" over straight intermediate sections 80' and 80" of the twist axles 10' and 10" by values Δ H' and Δ H". The dimension "H" remains the same for the end sections 37 and 38 as it was for the prior art arrangement of FIG. 1.

In FIGS. 4A and 4B, the shear center line 32 is lowered at the section 80' of the twist axle 10' and is connected by open-S, transitions 82 and 84 to the end sections 37 and 38 of the transaxle 10' of FIG. 3. The arcuate transition portions of FIG. 3 have convex portions 85 and 86 and concave portions 88 and 90 to facilitate a smooth, curvilinear transition to the lowered, straight intermediate section 80'. As is seen in FIG. 4B, the shear center line 32' is below the shear center line 32 of the end sections 37 and 38 by the distance Δ H'.

Figure 5A:
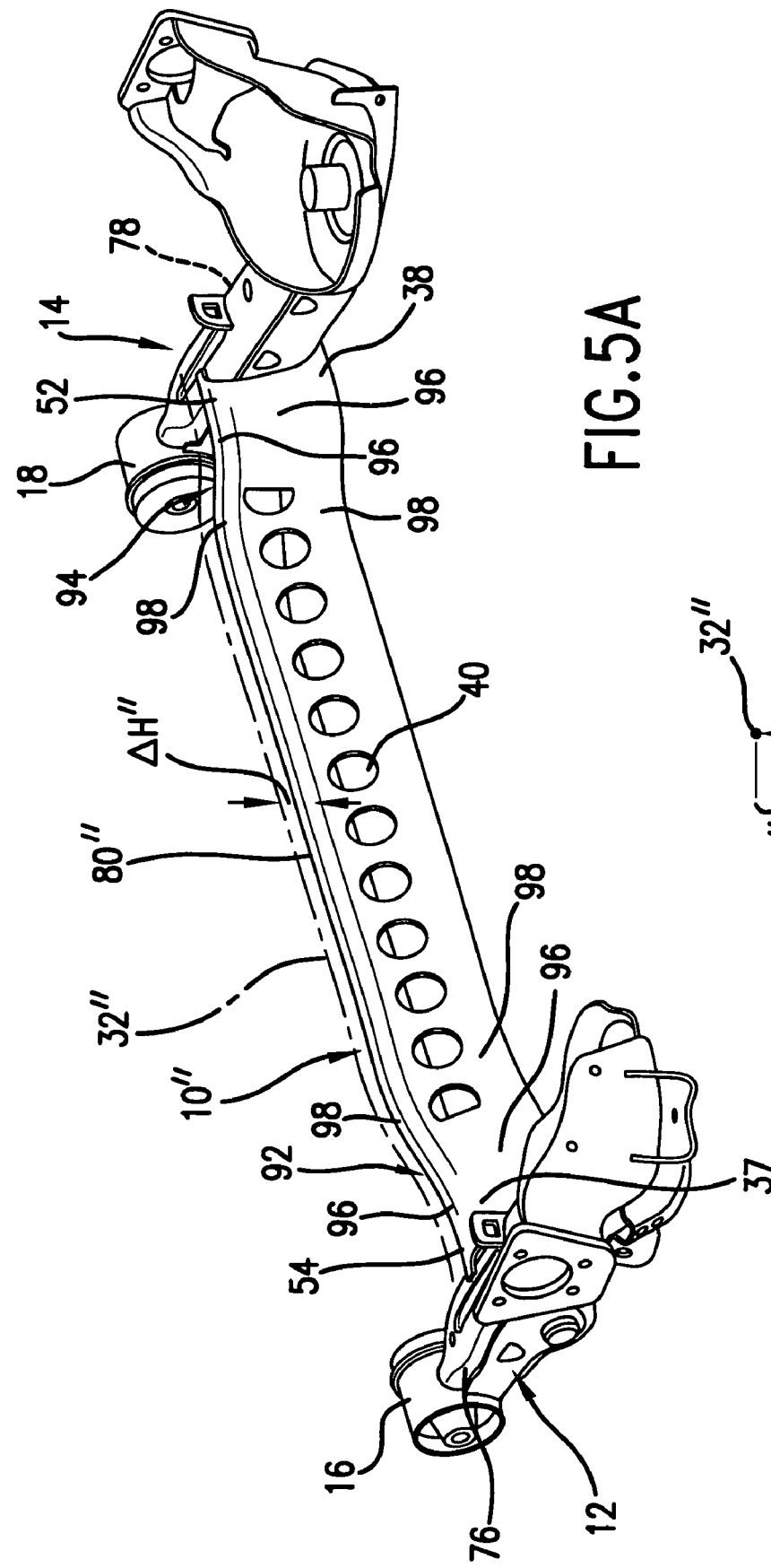
FIG. 5A is a perspective side view of a twist axle assembly configured in accordance with a second embodiment of the present invention.
Figure 5B:
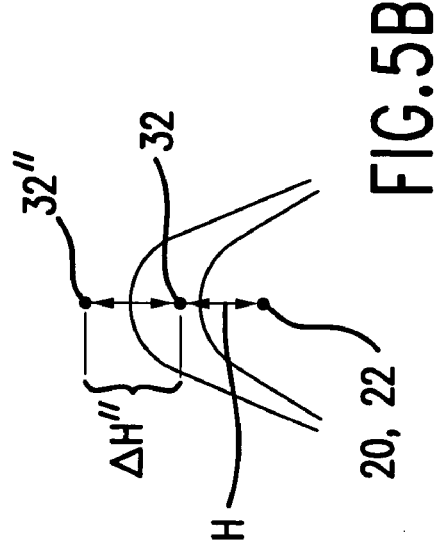
FIG. 5B is an elevation through the twist axle of FIG. 5A showing a change ΔH" between end sections of the twist axle and an intermediate section.

Referring now to FIGS. 5A and 5B where a second embodiment of the invention is shown, the straight intermediate section 80" is raised with respect to the end sections 37 and 38 and joined to the end sections by curvilinear portions 92 and 94, which curvilinear portion 92 and 94 have a concave portion 96 and a convex portions 98 in order to provide an open-S, transition with the end sections 37 and 38. As is seen in FIG. 5B, the shear centerline 32" of the straight intermediate sections 80" is above the shear centerlines 30 of the end sections 37 and 38 by a distance ΔH".

By the arrangements of FIGS. 4A and 4B and FIGS. 5A and 5B, the vehicle manufacturer does not have to compromise vehicle configuration by using an axle designed for another model with a less optimal dimension H, or by being forced to manufacture another, different axle with the desired value of H. Solutions to this problem are either to weld the twist axle to the trailing arms at different heights, or to use modified shapes for the trailing arms 12 and 14, such that although the bushings and the wheels are in the same location, the twist axle 10 is welded in effect to the trailing arms 12 and 14 at a different relative height H. These solutions either modify the critical weld joints 50 and 51 between the twist axle 10 and the trailing arm, or involve changing the shape of the trailing. arms 12 and 14. In these solutions, peripherate welding and manufacturing equipment is needed to produce the twist axle 10 which increases the time to develop and validate the twist axle, which increased time adversely impacts product production timing. By utilizing the arrangements of FIGS. 4A and 4B, and 5A and 5B, the aforementioned difficulties are avoided.

From the foregoing description, one skilled in the art can easily ascertain the essential characteristics of this invention, and without departing form the spirit and scope thereof, can make various changes and modifications of the invention to adapt it to various usages and conditions.

I claim:

1. A twist axle suspension for an automotive vehicle, comprising:

first and second trailing arms each having a front end and a rear end joined by an intermediate portion providing a weld site, the front ends of the trailing arms having pivots pivoted to a body of the automotive vehicle and the rear ends of the trailing arms supporting rear wheels of the automotive vehicle;

a twist axle having first and second end sections abutting and welded to the trailing arms at the weld sites, the twist axle having a first wall portion facing the front ends of the trailing arms and a second wall portion facing the rear ends of the trailing arms;

wherein the first and second end sections of the twist axle have concave edges having a profile complementing convex inside surface profiles of the trailing arms;

an apex portion joining the wall portions to provide the twist axle with a cross section having a shear center line disposed above the apex portion, the shear center being spaced a selected distance H above the axes about which the trailing arms pivot;

a straight intermediate section of the twist axle being displaced from the first and second end sections to lower or raise the shear center line at the intermediate section without affecting the welds of the first and second end sections to the trailing arms; and wherein the concave edges extend below and above the profiles of the trailing arms with the apex portion of the twist axle extending partially over the trailing arms.

2. The twist axle suspension of claim 1 wherein the trailing arms have convex inside surface profiles and outwardly facing outer surfaces and wherein the profiles of edges of the wall portions at the end sections of the twist axle are substantially C-shaped and are welded to the convex inside surface profiles of the trailing arms and terminate inboard of the outwardly facing outer surfaces of the trailing arms.

3. The twist axle suspension of claim 2 wherein the shear center line of the intermediate section is below the shear center line of the end sections.

4. The twist axle suspension of claim 2 wherein the shear center line of the intermediate section is above the shear center lines of the end sections.

5. The twist axle suspension of claim 2 further including bottom support brackets disposed between the wall portions at the first and second ends of the twist axle, the bottom support brackets being welded to the wall portions of the twist axle and extending beneath the trailing arms.

6. The twist axle suspension of claim 1, further comprising an elongated stabilizer shaft disposed between the first and second wall portions of the twist axle and rigidly attached at opposing ends thereof to the first and second trailing arms.

7. The twist axle suspension of claim 1, wherein each of the wall portions defines a plurality of perforations therethrough.

8. The twist axle suspension of claim 1, wherein the intermediate section of the twist axle is below the end sections such that the twist axle has a generally concave-up longitudinal profile.

9. The twist axle suspension of claim 1, wherein the intermediate section of the twist axle is above the end sections such that the twist axle has a generally concave-down longitudinal profile.

* * * * *